United States Patent [19]

Greenfield et al.

[11] 4,289,578

[45] Sep. 15, 1981

[54] PROCESS AND APPARATUS FOR RECOVERING CLEAN WATER AND SOLIDS FROM AQUEOUS SOLIDS

[75] Inventors: Charles Greenfield, Murray Hill; Robert E. Casparian, Boonton; Anthony J. Bonanno, Parsippany, all of N.J.

[73] Assignee: Hanover Research Corporation, East Hanover, N.J.

[21] Appl. No.: 94,109

[22] Filed: Nov. 14, 1979

Related U.S. Application Data

[62] Division of Ser. No. 719,515, Sep. 1, 1976.

[51] Int. Cl.³ .................................. B01D 1/26
[52] U.S. Cl. ........................... 159/47 WL; 159/17 R; 159/DIG. 13; 159/DIG. 25; 208/187
[58] Field of Search ...................... 159/47 WL, 17-20, 159/13, DIG. 13, DIG. 25; 202/174; 208/187

[56] References Cited

U.S. PATENT DOCUMENTS 3,323,575 6/1967 Greenfield ............................ 159/17

3,855,079 12/1974 Greenfield et al. ............... 159/17 R

Primary Examiner—Norman Yudkoff
Attorney, Agent, or Firm—Richard L. Cannaday

[57] ABSTRACT

Process and apparatus for recovering clean water and solids from aqueous solids. Aqueous solids are mixed with a low viscosity, relatively volatile, water-immiscible light fluidizing oil to obtain a mixture which will remain fluid and pumpable after removal of essentially its entire water content. The mixture of solids, water and fluidizing oil is subjected to a dehydration step by heat evaporation whereby substantially all of the water and at least part of the light oil are evaporated and subsequently recovered. The light fluidizing oil is then largely separated from the solids. Those solids carrying residual light fluidizing oil are then brought into direct contact with steam, referred to herein as "blowing steam". The presence of the blowing steam reduces the boiling point of the water-immiscible light fluidizing oil to effect its more efficient removal from the solids. Effluent blowing steam and light oil vapor removed from the solids may be used to supply heat to the overall process.

5 Claims, 6 Drawing Figures

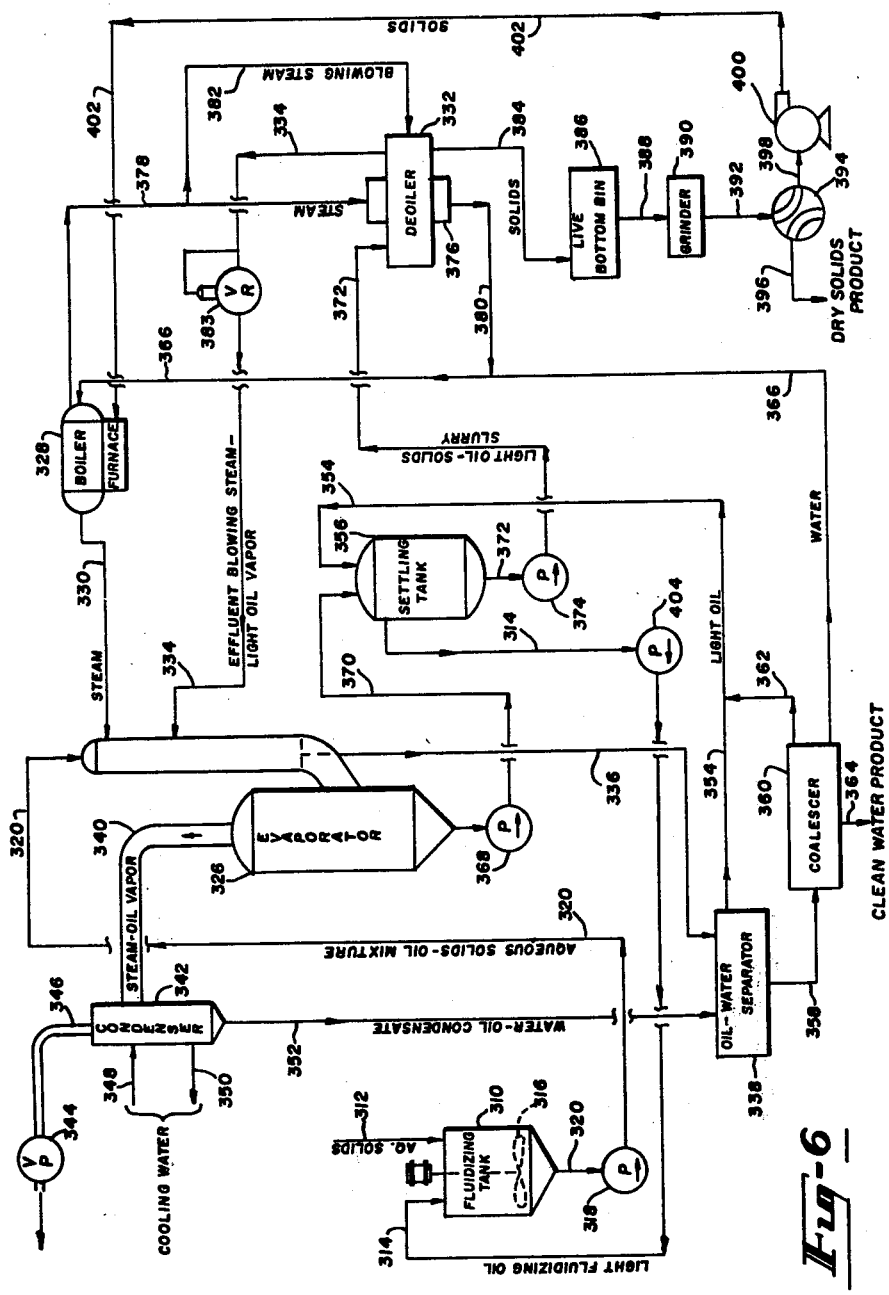

PROCESS AND APPARATUS FOR RECOVERING CLEAN WATER AND SOLIDS FROM AQUEOUS SOLIDS

This is a division of application Ser. No. 719,515, filed Sept. 1, 1976.

BACKGROUND OF THE INVENTION

The economic disposal of waste solids and recovery of clean water from aqueous solutions and dispersions thereof is a recognized problem. Also, the need to recover clean water and valuable solid materials from aqueous solutions and dispersions thereof is a common occurrence. Ideally, apparatuses and processes for the recovery of water from aqueous solids should provide ease of disposition of all constituents, avoidance of pollution, economic operation and hygienic handling, and should, in addition, yield clean water. Furthermore, in the course of recovering clean water it is desirable to obtain by-products, both solid and liquid, which are either valuable in themselves or can be utilized to further the economics of the process. For purposes of this invention it is to be understood that the term "aqueous solids" is employed generically to include suspensions, dispersions, solutions, mixtures and other forms of fluid association of solids in water.

In our U.S. Pat. No. 3,855,079 titled "Process and Apparatus for Recovering Residual Oil from Solids Dehydrated in an Oil Medium and Grossly Deoiled" are described process and apparatus whereby aqueous solids are admixed with a relatively non-volatile fluidizing oil to form a mixture which is dehydrated by heat evaporation. The substantially anhydrous solids in fluidizing oil slurry thus formed is thereafter separated into the oil phase and the solids phase. However, the solids have sorbed thereon appreciable amounts of fluidizing oil which contaminates the solids and which will be lost to the process and contribute to unfavorable economics if not recovered. Accordingly, the fluidizing oil-laden solids are subjected to a subsequent extraction step using a relatively volatile, water-immiscible light oil. The light oil-laden solids are then brought into direct contact with blowing steam. The presence of the blowing steam reduces the boiling point of the residual waterimmiscible light oil to effect its more efficient removal from the solids.

SUMMARY OF THE INVENTION

The process and apparatus of this invention comprise a series of steps and a systematic arrangement of equipment for recovering clean water and solids from aqueous solids. Aqueous solids are slurried with a low viscosity, relatively volatile, water-immiscible light fluidizing oil and the mixture subjected to dehydration by heat evaporation whereby substantially all the water and part of the light fluidizing oil are vaporized. The mixed vapor is condensed and separated into a clean water fraction and a recovered light oil fraction. The resultant slurry of substantially anhydrous solids in light fluidizing oil is separated into an oil phase and a solids phase which is laden with residual light fluidizing oil. The separation of the oil phase and the solids phase may be carried out as a gravity separation or a pressing apparatus of either a static or a dynamic variety, or both, may be used. The process and apparatus of the instant invention provide for economical removal of the residual light oil from the separated dry solids without the necessity of an extraction step.

It is therefore an object of this invention to provide process and apparatus for the dehydration of aqueous solids in a light fluidizing oil medium.

It is another object of this invention to provide process and apparatus for the recovery of clean water from aqueous solids.

It is yet another object of this invention to provide process and apparatus for recovering substantially dry, fluidizing oil-free solids from aqueous solids dehydrated in a light fluidizing oil medium.

It is still another object of this invention to provide process and apparatus for recovering essentially dry solids derived from heavy oil-containing aqueous solids which have a reduced heavy oil content compared to the original heavy oil content of the raw feed on a moisture-free basis.

Yet another object of this invention is to provide process and apparatus for recovering essentially dry solids derived from heavy oil-containing aqueous solids which have substantially the same heavy oil content as the original feed on a moisture-free basis.

The foregoing and other objects are accomplished by the practice of this invention. Broadly, viewed in one of its principal aspects, this invention consists of a process for the recovery of clean water and substantially dry, fluidizing oil-free solids from aqueous solids dehydrated in a light fluidizing oil medium comprising the steps:

1. Admixing aqueous solids with a low viscosity, relatively volatile water-immiscible light fluidizing oil to obtain a mixture which will remain fluid and pumpable after the removal of the water content therefrom;

2. Subjecting the resultant oil-containing mixture to dehydration by heat evaporation whereby substantially all the water and part of the light fluidizing oil are vaporized, yielding a substantially anhydrous solids in oil slurry;

3. Condensing the resultant mixed water and light oil vapor;

4. Separating the resultant condensate into a clean water fraction and a light oil fraction;

5. Separating at least some of the relatively volatile, water-immiscible light fluidizing oil from said substantially anhydrous solids in oil slurry, and 6. Bringing the resultant light fluidizing oil-laden solids into direct contact with blowing steam to thereby efficiently remove said light oil from said substantially anhydrous solids by heat evaporation.

The foregoing process is carried out in an apparatus for recovering clean water and substantially dry, fluidizing oil-free solids from aqueous solids dehydrated in a light fluidizing oil medium, said apparatus comprising a systematic arrangement of items of equipment as follows:

1. A tank adapted to receive a stream of said aqueous solids and provided with a stirring or mixing mechanism;

2. A light fluidizing oil reservoir;

3. Means for transmitting light fluidizing oil from said light oil reservoir to said tank wherein said light fluidizing oil and aqueous solids may be mixed;

4. An evaporator;

5. A conduit extending from said tank to said evaporator wherethrough may flow a stream of aqueous solids admixed with light fluidizing oil from said tank into the evaporating region of said evaporator;

6. A condenser;

7. A conduit extending from said evaporator to said condenser through which may flow a mixture of water vapor and light oil vapor formed as a result of heating of said aqueous solids and light fluidizing oil mixture;

8. An oil-water separating means;

9. A conduit extending from said condenser to said oil-water separating means wherethrough may flow a mixed condensate of water and light oil;

10. Means for separately withdrawing light oil and clean water from said oil-water separating means;

11. A liquid-solid separating means;

12. A conduit extending from said evaporator to said liquid-solid separating means wherethrough may flow a stream of a slurry of substantially anhydrous solids in light fluidizing oil;

13. A deoiler means;

14. A conduit extending from said liquid-solid separating means to said deoiler means wherethrough may flow a stream of light fluidizing oil-laden solids, and 15. A combustion apparatus associated with said evaporator and said deoiler means for supplying evaporative heat to said evaporator and blowing steam to come into direct contact with said light fluidizing oil-laden solids in said deoiler means. The instant invention thus provides process and apparatus for recovering solids and clean water from aqueous solids dehydrated in a light fluidizing oil medium. The invention is characterized by the recovery not only of clean water from aqueous solids which are dehydrated in a light oil medium but also of residual light oil from said solids. Aqueous solids are mixed with a low viscosity, relatively volatile, water-immiscible light fluidizing oil and the mixture subjected to a dehydration step by heat evaporation to remove substantially all of the water and part of the light oil. The remainder of the light fluidizing oil is then largely separated from the solids. The light fluidizing oil-laden solids are thereafter brought into direct contact with steam, referred to herein as "blowing steam", in a deoiling step. Since the light oil is water-immiscible, its direct contact with blowing steam amounts essentially to a steam distillation wherein the light oil in the presence of blowing steam boils at a temperature below its normal boiling point.

The nature and substance of the present invention as well as its objects and advantages will be more clearly perceived and fully understood by referring to the following description and claims taken in connection with the accompanying drawings which are described briefly below.

BRIEF DESCRIPTION OF THE DRAWINGS

FIG. 6 depicts the apparatus of yet another embodiment of the invention wherein the apparatus is relatively simple and compact in that a single stage evaporator is employed and the substantially anhydrous slurry of solids in light fluidizing oil is separated by gravity into an oil phase and a concentrated oil-solids slurry, thereby precluding the necessity for a pressing apparatus.

DESCRIPTION OF THE PREFERRED EMBODIMENTS

Figure 1:
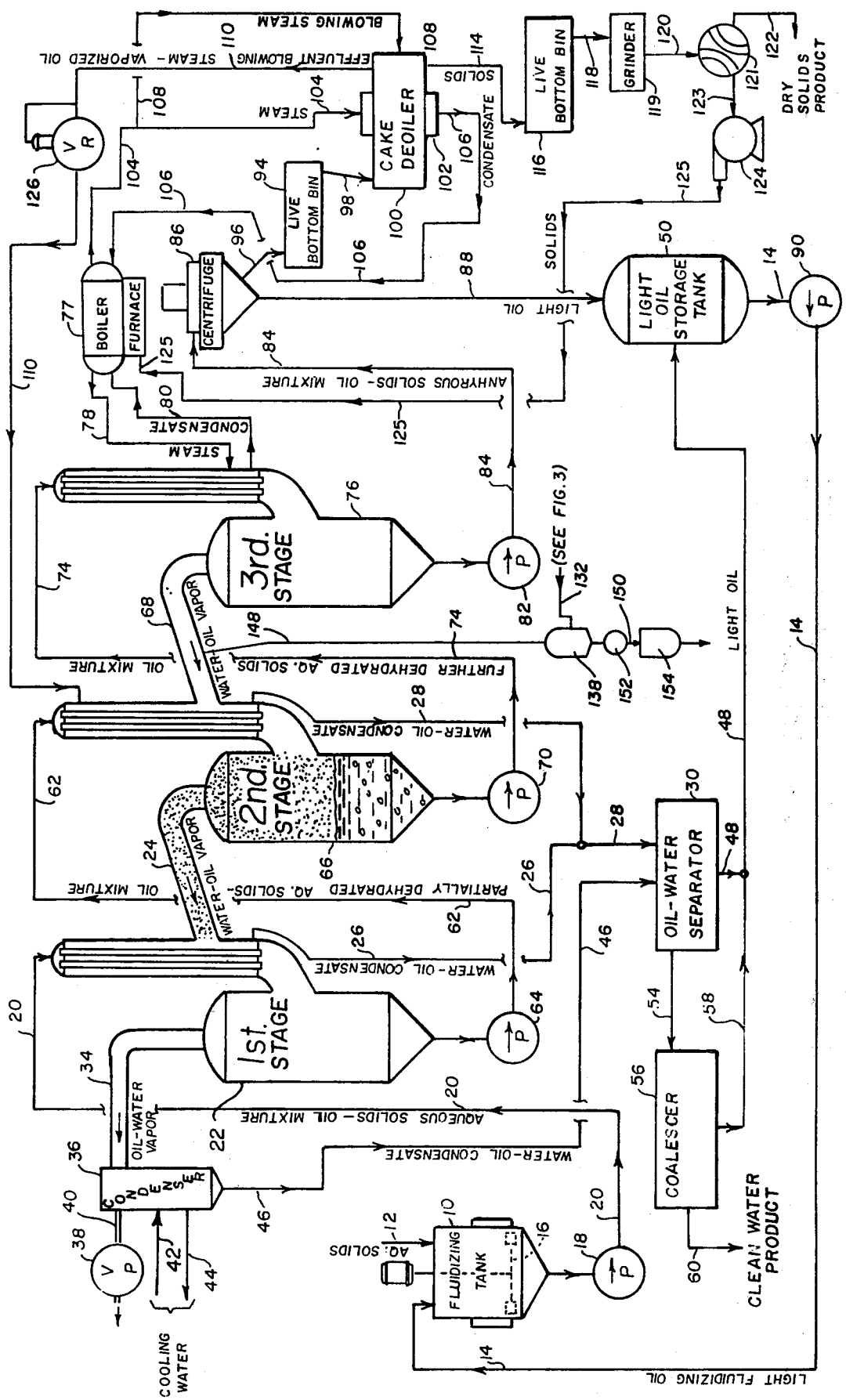
FIG. 1 illustrates the apparatus of the embodiment of the invention wherein blowing steam is brought into direct contact with light fluidizing oil-laden solids in a deoiler apparatus operating at essentially atmospheric pressure to thereby facilitate the removal of said light oil therefrom.

The clean water and solids recovery process of this invention as applied to aqueous solids is thus characterized by the recovery of residual light oil from solids previously substantially dehydrated in a light fluidizing oil medium. The process comprises mixing aqueous solids with a low viscosity, relatively volatile, water-immiscible light fluidizing oil to obtain a mixture which will remain fluid and pumpable after removal of essentially its entire water content, and thereafter subjecting the resultant mixture of solids, water and oil to a dehydration step by heat evaporation whereby substantially all of the water and at least part of the light fluidizing oil are evaporated and subsequently recovered. Extremely dilute aqueous solids may be concentrated by evaporation prior to mixing with the light oil. The vapors from the subsequent oil dehydration step can be used to supply the energy to this fluidizing oil-free concentration stage of the evaporator system. Following dehydration, the light oil is largely separated from the solids. Those solids carrying residual light fluidizing oil are brought into direct contact with blowing steam whereby the light oil is removed by heat evaporation. In one embodiment of the invention wherein the solids are water-insoluble and originally contain heavy oil which is extracted by the light fluidizing oil, the light fluidizing oil-laden solids are slurried with water and said slurry is directly contacted with steam in an evaporator to thereby cause evaporation of substantially all of the light oil and at least some of the water. The solids are then removed from the remainder of the water as, for example, by means of a settling tank.

A critical step in the practice of the instant invention is the direct contacting of the light fluidizing oil-laden solids with blowing steam to thereby effect evaporation of said light oil. Thus, not only may the blowing steam if it be superheated supply the latent heat for evaporation of the light oil but, since said light oil and water are immiscible and since it is a well-known scientific fact that any mixture of two immiscible liquids must boil at a temperature lower than the boiling point of the higher boiling liquid, it follows that the light fluidizing oil is evaporated from the solids at an appreciably lower temperature than if the steam were merely an extraneous heat source that did not come into direct contact with the light fluidizing oil-laden solids. On the other hand, the light oil-laden solids may be directly contacted with saturated blowing steam at atmospheric pressure and a temperature of about 212° F. provided heat for vaporization of the light oil is supplied by an external source such as via a heat jacketed device. Lower steam temperatures in the range of about 150° F. or less may be employed provided the contacting of the light oil-laden solids with blowing steam is carried out under subatmospheric pressure and provided heat for vaporization of the light oil is supplied by an external source such as by a heat jacket. It will be understood that, as a result of the external heat, the solids will in every case be at a temperature in excess of the boiling point of water at that particular pressure.

By light fluidizing oil is meant an organic liquid that is water-immiscible and relatively fluid as well as relatively volatile. Thus, a relatively volatile fluidizing oil is mixed with the aqueous solids prior to the dehydration thereof. Dehydration by heat evaporation results in removal of substantially all of the water and part of the light fluidizing oil. The remainder of the light oil is largely separated from the solids, thereby leaving solids laden with residual light fluidizing oil. By the practice of this invention, light oils that otherwise boil too high when heated by an extraneous heat source, e.g., about 150°–550° F., can be used as the fluidizing oil in the dehydration step. The direct contacting of the light fluidizing oil-laden solids with blowing steam according to this invention amounts, in effect, to steam distillation wherein light oils that otherwise boil in the range of from about 150° F. to about 550° F. are distilled at temperatures within the range of from about 70° F. to about 400° F.

In the practice of this invention, the essentially anhydrous slurry of solids in light fluidizing oil is separated to recover the oil and the solids in a largely dry condition but containing sorbed light fluidizing oil. This may be accomplished by gravity or by mechanical pressure of either a static or a dynamic variety, or both, on the anhydrous slurry whereby the greater part of the oil is separated from the solids. In some cases, as in the processing of food products, sewage sludge, rendering raw materials, or slaughter house wastes, the material itself contains an appreciable amount of oil independently of light fluidizing oil which may be added to it prior to the dehydration step. If this oil is a light oil, it essentially becomes part of the light fluidizing oil and will be either evaporated during dehydration and subsequently recovered or carried through the dehydration step along with the solids and the major part of the added fluidizing oil and be subjected to being separated from the dehydrated slurry along with the added oil. If the essentially water-free slurry be subjected to a sufficiently efficient separation, it may thus be made to yield oil in a quantity or at a rate equal to or in excess of that in or at which oil was previously added to the aqueous solids. If the oil associated with the aqueous solids is a heavy, relatively non-volatile oil, it may in effect be extracted from the essentially dry solids by the light fluidizing oil during the separation step, e.g., a pressing operation, separated from the light oil, and recovered. Alternatively, if the extracted heavy oil is not separated from the light fluidizing oil and the entire oil mixture is recycled as fluidizing oil, an equilibrium results wherein the heavy oil content of the essentially dry solids product is substantially the same as that of the original feed on a moisture-free basis.

Generally it is desirable that the overall oil separation and deoiling steps yield enough oil for reuse in the dehydration step so that the process will be self-sufficient with respect to light fluidizing oil requirements. Even more desirably, in some cases such as when the aqueous solids initially contain a light oil, the combined oil separation and deoiling steps will generate somewhat more light oil than is needed for the dehydration step so that the process will provide a net oil yield. Also, if the aqueous solids initially contain a heavy oil, this may be extracted by the light fluidizing oil and recovered as set forth above.

No matter how vigorous the separation, e.g., pressing, of the essentially anhydrous slurry of solids in light oil, the recovered solids will have sorbed thereon appreciable quantities of light oil which, if not recovered, will be lost to the process. The liquid-solid separating means to separate the light fluidizing oil from the solids may be, for example, a settling tank where separation occurs by gravity. Alternatively, separation may be by means of a mechanical press of the static variety, e.g., a reciprocating filter press, or, more advantageously, by means of a dynamic separating device such as a centrifuge. However, both static and dynamic presses may be used. Accordingly, most of the light oil is pressed from the solids in, for example, a centrifuge, and the oil may be collected in a suitable reservoir where it is available for reuse in the process if so desired. If the aqueous solids originally contain a heavy oil, it may be separated from the essentially anhydrous solids due to extraction by the light fluidizing oil during the liquid-solid separating step. If the separate oil is divided into its light oil and heavy oil components and only the light oil component recycled as fluidizing oil, the net result is a reduction in the heavy oil content of the dry solids. On the other hand, if the gross separated oil comprised of light fluidizing oil and extracted heavy oil is recycled as the fluidizing oil, an equilibrium is attained wherein heavy oil is put back into the dry solids at the same rate it is removed by the recycled gross fluidizing oil. The net result is essentially dry solids having substantially the same heavy oil content on a moisture-free basis as the original feed.

Since the light fluidizing oil may have a low viscosity and a low specific gravity, e.g., light oils of petroleum origin, the dehydrated slurry from the evaporator can be transferred to a settling tank whereby a more concentrated solids in oil phase may be separated as a thickened slurry; the bulk of the oil remains at the stop of the tank from which it may be recycled to the process. The foregoing gravity separation operation does not require a mechanical press of either a static or a dynamic variety.

The concentrated oil-solids slurry or solids having oil sorbed thereon are then brought into direct contact with blowing steam. The blowing steam, if superheated, supplies latent heat for the evaporation of the light oil or, alternatively, saturated blowing steam at about 212° F. may be used in conjunction with external heat as from a steam jacket to supply heat for evaporation of the light oil. Since the light oil is water-immiscible, its direct contact with the blowing steam amounts essentially to a steam distillation wherein the light oil boils at a temperature below its normal boiling point. Thus, not only is the light oil more readily evaporated from the solids with less heat energy being required from the blowing steam alone or in conjunction with an extraneous heat source such as indirect thermal contact with steam or another heat transfer fluid in, for example, a steam jacket, but it makes possible the use of higher boiling light oils. Any heavy oil present on the dry solids, however, is essentially not evaporated.

The direct contacting of oil-laden solids or a concentrated oil-solids slurry with blowing steam, as discussed above, permits evaporation of the light oil at a temperature below its normal boiling point. However, in certain applications such as deoiling of temperature-sensitive materials like food products for human consumption and animal feeds, even lower temperatures for evaporation of the light oil are desired. This may be accomplished by contacting the oil-laden solids with blowing steam at less than atmospheric pressure.

The removal of light oil from the solids by direct contact with blowing steam may conveniently take place in a deoiler apparatus which may advantageously be connected to the discharge of the settling tank or pressing apparatus, e.g., a centrifuge, and which may be operated at atmospheric or less than atmospheric pressure. If desired, the deoiler apparatus may be externally heated as by means of a steam jacket. Blowing steam is passed into the deoiler apparatus containing the concentrated oil-solids slurry or oil-laden solids. It is desirable to utilize effluent blowing steam and vaporized light oil from the deoiler apparatus in the process as a source of heat. The vaporized light oil is eventually condensed and reused in the dehydration process. Any heavy oil present on the solids is essentially not evaporated.

In one embodiment of the invention, the aqueous solids are water-insoluble and are intially associated with a heavy oil which is substantially extracted by the light fluidizing oil, and thereafter the light fluidizing oil and the extracted heavy oil are separated. The light fluidizing oil-laden solids are slurried with water and the slurry conducted to the evaporating region of an evaporator where at least a portion of the water is converted to steam. That steam is the blowing steam which directly contacts the light oil-laden solids and causes evaporation of the waterimmiscible light oil in the same general way as the evaporation occurs in the deoiler apparatus described above. As mentioned, some water of the aqueous slurry is also evaporated. The solids are then separated from the remaining water by such means as a filter or a settling tank. The recovered solids are not only free of light fluidizing oil, but they are also essentially free of the heavy oil with which they were originally associated.

The solids left after removal of the light oil therefrom by direct contact with blowing steam may often be utilized for purposes outside the process itself and thus constitute a process product. The process and apparatus of this invention may be used to recover clean water and essentially dry solids from aqueous solids derived from numerous sources whether they be waste solids or solids having intrinsic value. Thus, for example, this invention finds utility in the recovery of water and solids from a variety of materials which are found in aqueous solution, in water dispersion or otherwise associated with water, e.g., powdered coal, food products, animal feeds and wastes, cement, spent lime, inorganic salts, sewage, sewage sludge, slaughter house effluent and rendering materials, slimes, black liquors from the paper industry, certain tree barks, the organic streams from garbage disposal plants, pharmaceutical products and wastes, cannery or canning factory effluent, chemicals, etc. Accordingly, depending on the source, the solids recovered from the blowing steam contacting operation may be used as fertilizer, as animal feed, or possibly as food for human consumption, e.g., a dehydrated, fat-free food product. Further, since they are often burnable, they may be used as fuel for the generation of steam needed to run the evaporator component of the apparatus, blowing steam for contacting the concentrated oil-solids slurry or the oil-laden solids, and also the steam needed to run auxiliary equipment such as pumps, either directly if they be steam-driven pumps or indirectly if they be motor driven pumps and the steam is used to run a turbogenerator directly. Any heavy oil remaining on the essentially dry solids also may have fuel value. The process may thus be at least partly self sufficient in respect of fuel requirements. The process and apparatus of this invention thus provide means for the recovery of essentially clean water and valuable solid products from aqueous solids. Furthermore, this invention is characterized by the fact that residual light fluidizing oil from the dehydration step that is sorbed on or otherwise associated with the solids is efficiently recovered for reuse.

The material to be treated by the process of this invention should contain solid particles generally smaller than about $\frac{1}{4}$ inch. However, larger particles are acceptable, as in the case of bone for gelatin manufacture, provided that the clearances between heat transfer surfaces is increased accordingly. Larger particles may be ground to size or comminuted by existing techniques.

The light oils that are utilized for admixture with the aqueous solids prior to the dehydration operation are inert and waterimmiscible. In addition, they should be sufficiently volatile to be evaporated by direct contact with blowing steam at a temperature within the range of from about 70° F. to about 400° F. Generally, light oils boiling within the range of from about 150° F. to about 550° F., and preferably from about 300° F. to about 450° F., are contemplated as being useful for this purpose. Light oils such as hydrocarbon oils boiling within the range of about 325° F. to about 400° F. are particularly preferred in the processing of animal feeds and food products for human consumption since this boiling range permits almost complete removal of the oil from the dried solids product. The usually preferred class of ligh oil is light hydrocarbon oil. The light hydrocarbon oil may be normal paraffinic, isoparaffinic, aromatic, or naphthenic. Examples of suitable light hydrocarbon oils are n-pentane, isopentane, n-hexane, cyclohexane, benzene, isooctane, eicosane, petroleum fractions boiling in the range of from about 300° F. to about 450° F., isohexane, xylene, octadecane, toluene, n-heptane, cyclopentane, and mixtures thereof. Another class of suitable light oils is water-immiscible fatty alcohols. Examples of suitable alcohols are n-hexyl alcohol, n-heptyl alcohol, isoheptyl alcohol, n-octyl alcohol, isooctyl alcohol, n-nonyl alcohol, and n-decyl alcohol. Fatty acids such as caproic acid and capric acid may also be used as the light oil. In processing food products and animal feed, an FDA approved light oil such as the series of isoparaffinic oils manufactured by Humble Oil and Refining Company under the trademark "Isopar" may be used. Particularly preferred in processing animal feeds and food products for human consumption is Isopar H because its flash point permits safe operation and its boiling temperature, which is within the range of about 325° F. to 400° F., allows for almost complete removal of the oil from the dried food product, thereby complying with FDA regulations. Generally, materials that are liquid at the temperature of operation, that are preferably oil-like and that are relatively volatile and essentially immiscible with water may be employed. It is often desirable to employ a light oil that imparts process credits, i.e., one that can add value to the solids product, such as waste oils normally found in sewage or industrial waste, or fuel oils, or, as suggested above, employ oils derived in the practice of the process itself so as to minimize cost factors. The quantity of light fluidizing oil is such that its ratio in the system is in the range of about 2 to about 20 parts or more by weight, based on each part of non-fat or non-oil based solids. This refers to total oil, i.e., that added plus that derived from the process for reuse. This amount of oil gives a fluid, pumpable mixture even in the absence of water. The term "fluid" as used here is intended to be synonomous with "liquid," i.e., taking the shape of the container to the extent that the mixture fills the container.

While the dehydration step of this invention may be carried out in the single stage or single effect evaporators known in the art, it is preferred that this step be accomplished in a plurality of sequential heat evaporation steps wherein each of the successive evaporation steps is at a successively higher temperature and the resulting solids streams are of successively higher concentration because of increasing dehydration, the evolved vapors of each evaporation step supplying a substantial portion of the heat requirements of the preceding heat evaporation step. Thus the plurality of sequential heat evaporation steps connotes at least two. The temperatures, pressures and concentrations in each of the successive series of evaporation steps are largely empiric in nature, depending upon the systems and oils being employed. The normal processing temperatures for the dehydration of the light fluidizing oil-aqueous solids mixture may be in the range of about 70° F. to about 250° F. in the first stage and in the range of about 100° F. to about 400° F. in the second, third or final stages of a multi-effect drying system. The preferred processing temperatures are in the range of about 90° F. to about 175° F. in the first stage and in the range of about 125° F. to about 350° F. in the second, third or last stages. The foregoing ranges and progressions of temperatures are reasonable in the case where the flows through the evaporator of the mixture being dehydrated and the heating or drying steam are substantially countercurrent, the evaporator in that mode of operation being called a "backward flow" evaporator. The temperatures also depend on the desired quality of the end product and the economics of fuel utilization, cooling water availability, capital investment, etc.

In the foregoing paragraph the expression "first stage" refers to that part of the evaporator equipment in which the light fluidizing oil-aqueous solids mixture is subjected to the first step of a sequential plurality of evaporation steps, two or three or more corresponding to "second stage," "third stage," etc. The expression "effect," on the other hand, as in "multiple-effect" or "multi-effect," is related to the flow and action of the heating medium, customarily steam, in the evaporator equipment. Where the flow of a light fluidizing oil-aqueous solids mixture being heated and evaporated is countercurrent to that of the heating steam (backward flow), the first stage of the evaporator is the same as its last effect.

The pressures are not critical and are controlled with temperatures to achieve desired evaporation rates in a given design. Thus the first stage pressure will conveniently be from about ½ inch Hg absolute to approximately atmospheric. The pressures then increase in successive stages responsive to the temperatures in the aforedescribed countercurrent or backward flow case. It is advantageous to operate the first stage at subatmospheric pressures and the final stages at close to atmospheric.

The advantage of the sequential evaporation steps may be seen from the following. For example, in a double-effect evaporator with feed entering at 80° F., the material can leave the evaporator at 225° F.–250° F. with ratios of approximately one pound of steam utilized for approximately 1.5 to 1.75 pounds of water evaporated; whereas in normal single-effect operations about 1.5 pounds of steam could be required to achieve the same result with only one pound of water evaporated. If triple or more effect evaporation be utilized, even further economies in fuel consumption are made possible. It should be noted that the evolved vapors from each of the heat evaporation steps after the first step supply a substantial portion of the heat requirements of the preceding heat evaporation step or stage in the case of a backward flow evaporator. The only net or external heat input required is that needed to raise the temperature of the components to evaporation temperatures and to provide heat of vaporization as well as to make good for heat losses. The final product from the dehydration step is generally a substantially anhydrous oil-solids slurry containing no more than about 5–10 weight percent water on a non-fat basis.

Although backward flow evaporators are preferred, any type may be used. Thus, backward flow evaporators, forward flow evaporators, forward flow-backward flow evaporator combinations or, indeed, any combination thereof may be used. The equipments that are generally preferred are multiple-effect evaporators known in the art, e.g., Mojonnier, Bufflovac, Rodney-Hunt, recompression type evaporators such as thermal or mechanical recompression types, etc. Functionally, evaporator equipment may be of the forced circulation, flash, falling film recirculation, single pass, rotary wiped film, plate, or indeed any suitable type.

The separation of solids from the light fluidizing oil can be conveniently carried out by gravity separation or in a liquid-solids separating means, preferably in a dynamic press such as a centrifuge. The concentrated oil-solids slurry or solids having residual light oil sorbed thereon which are recovered from the liqud-solid separating means, e.g., centrifuge, are then brought into direct contact with blowing steam for removal of the residual light oil therefrom. Any residual heavy oil that may be present on the solids is essentially not removed by contact with the steam. In the embodiment of the invention exemplified in FIG. 1, oil-laden solids exiting from the centrifuge enter a deoiler apparatus operating at essentially atmospheric pressure where they are brought into direct contact with blowing steam. The deoiler apparatus may advantageously be externally heated as by passing steam through a heating jacket surrounding it. The blowing steam is preferably saturated steam at close to 212° F. and atmospheric pressure, but it may also be superheated in the range of about 250° F. to 500° F. The blowing steam coming in contact with light oil-laden solids within the deoiler apparatus causes evaporation of the light oil at a temperature below its normal boiling point. As stated above, any residual heavy oil on the oil-laden solids is not appreciably evaporated. The vaporized light oil and effluent blowing steam may advantageously be conducted from the deoiler apparatus and the energy thereof recovered as useful work as, for example, by being used as a source of heat in the evaporator region of the system.

Figure 2:
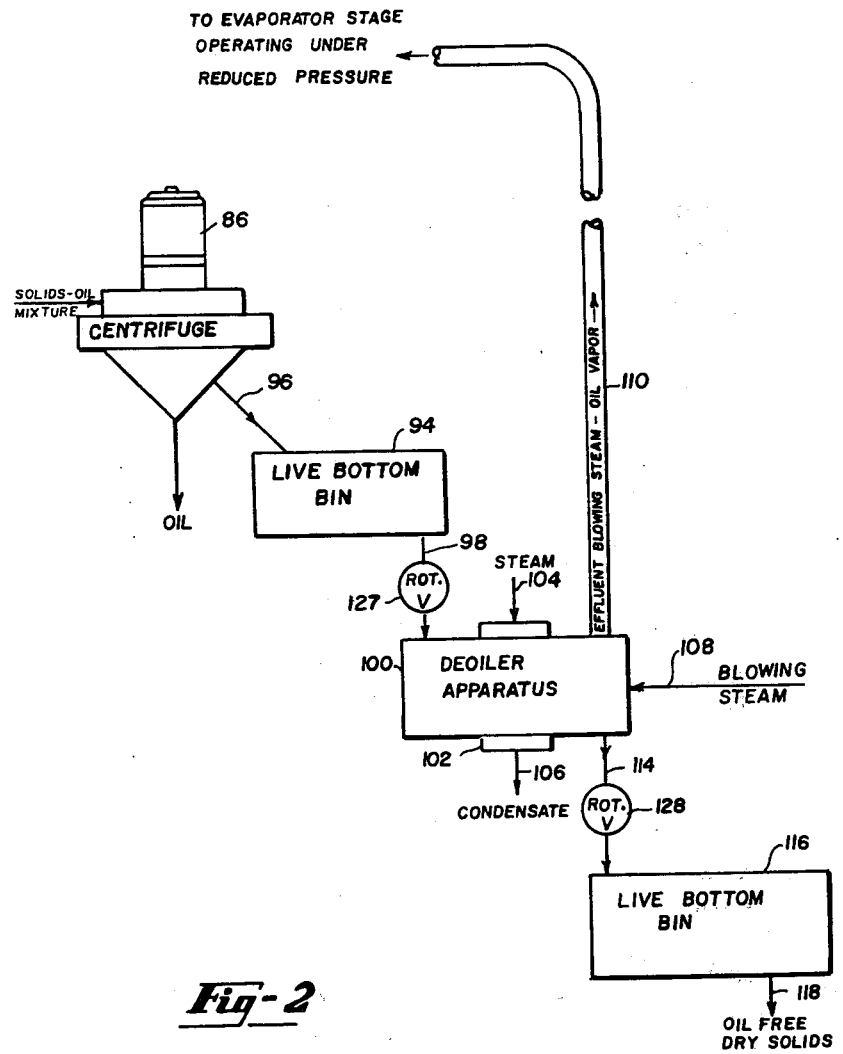
FIG. 2 depicts a portion of a modified apparatus of FIG. 1 illustrating an embodiment wherein the deoiler apparatus is operated under reduced pressure.

In the embodiment depicted in FIG. 2, the deoiler apparatus is connected directly to a drying evaporator operating under reduced, or less than atmospheric, pressure. As a result, the deoiler apparatus is also under reduced pressure. Hence, the deoiling operation requires less blowing steam and may be carried out at reduced temperature, an advantage when deoiling a temperature-sensitive material such as a food product for human consumption or an animal feed. The deoiler apparatus may be externally heated, as by a steam jacket, to provide latent heat.

Figure 3:
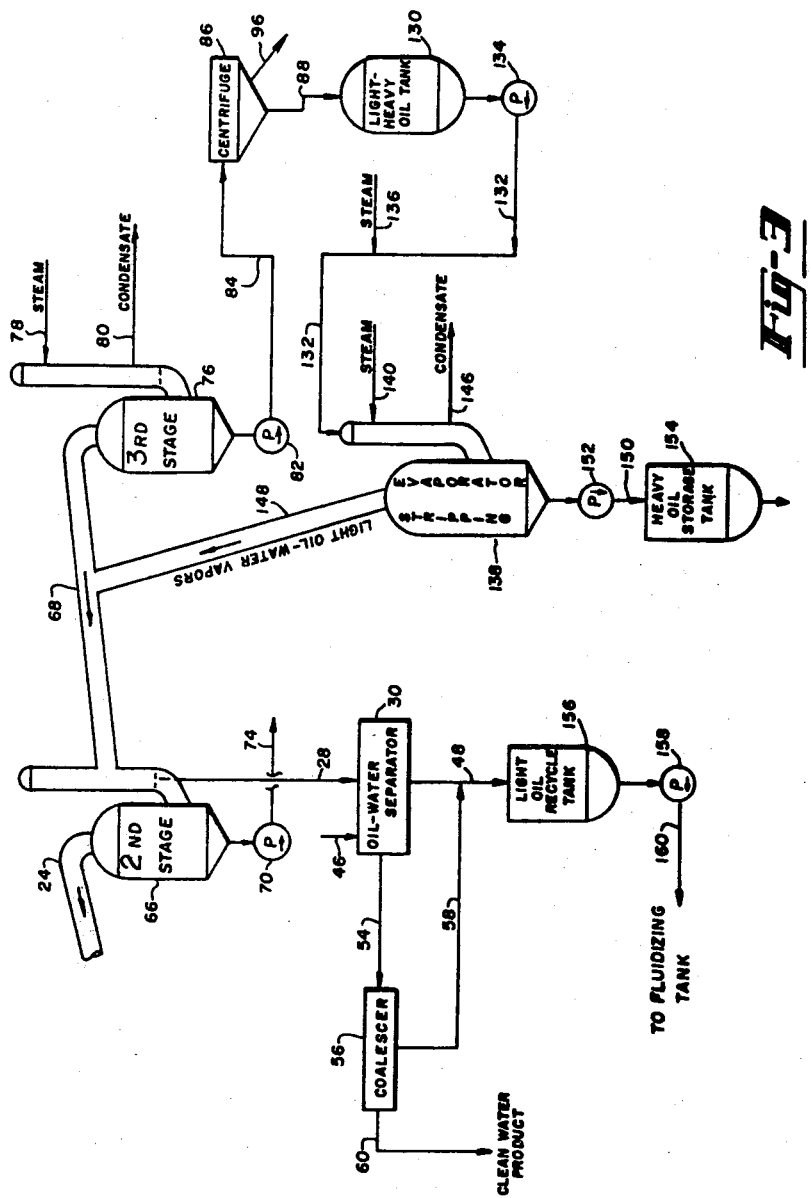
FIG. 3 depicts a portion of a modified apparatus of FIG. 1, illustrating an embodiment wherein the aqueous solids originally contain a heavy oil which is extracted by the light fluidizing oil and thereafter the light fluidizing oil and the extracted heavy oil are separated.

In the embodiment depicted in FIG. 3, the aqueous solids originally contain a heavy oil which is extracted by the light fluidizing oil and thereafter the light fluidizing oil and the extracted heavy oil are separated. The light fluidizing oil is recycled through the system. The oil-laden solids, as in FIG. 1 of which FIG. 3 is a modification, are directly contacted with blowing steam in a deoiler apparatus for removal of residual light fluidizing oil therefrom. Extraction of heavy oil initially in association with the aqueous solids by the light fluidizing oil results in a net decrease in the heavy oil content of the resultant essentially dry solids.

Figure 4:
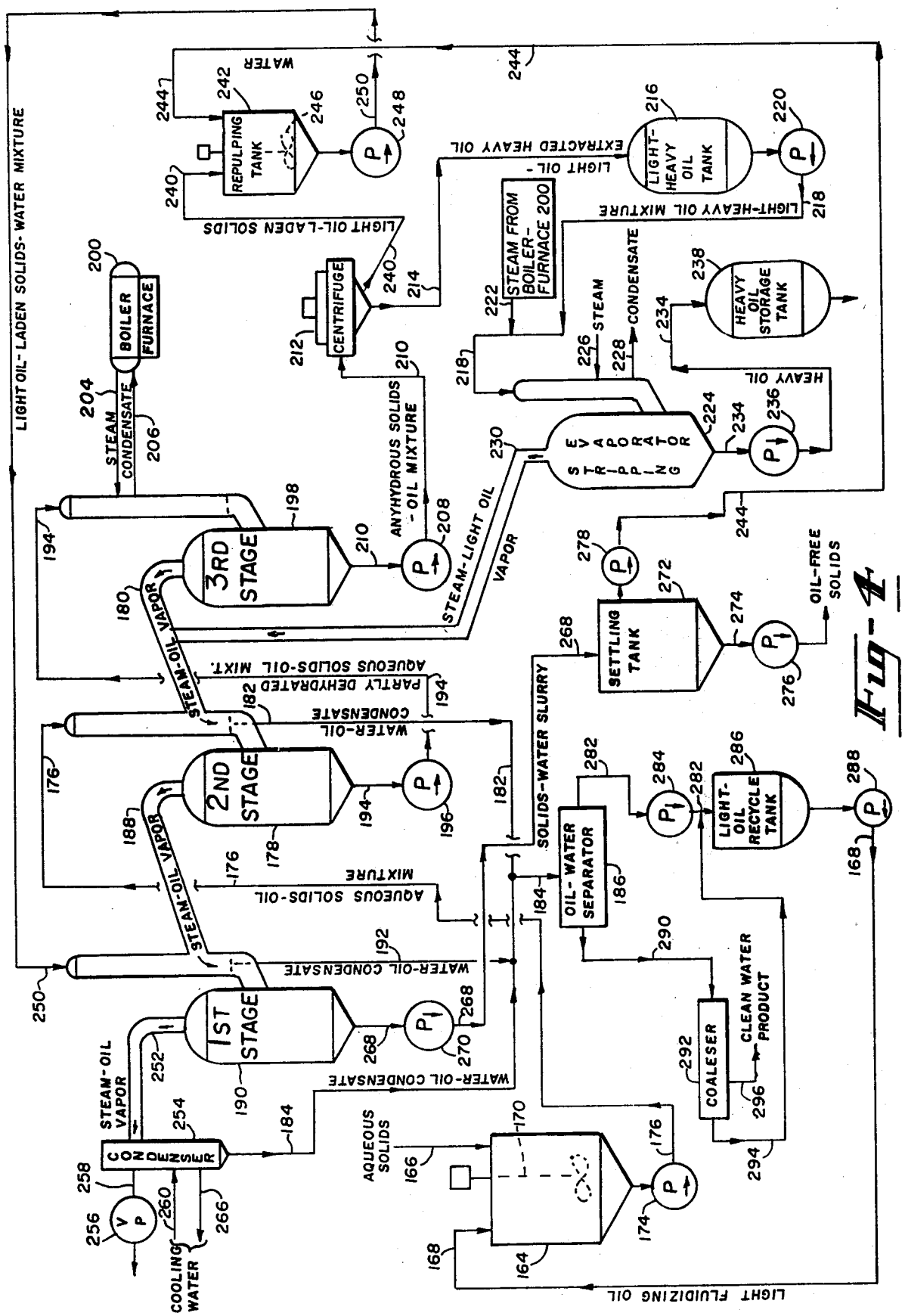
FIG. 4 illustrates the apparatus of that embodiment of the invention wherein water-insoluble solids originally contain a heavy oil which is extracted by the light fluidizing oil and thereafter the light fluidizing oil and the extracted heavy oil are separated. The light fluidizing oil-laden water-insoluble solids are slurried with water and said slurry is conducted to an evaporator where at least a portion of the water is converted to steam, thereby directly contacting the light oil-laden solids and facilitating the evaporation of said light oil.

In the embodiment illustrated in FIG. 4, the aqueous solids are water-insoluble and originally contain a heavy oil which is extracted by the light fluidizing oil. The light fluidizing oil and the extracted heavy oil are separated and the light oil recycled through the system. The light oil-laden solids are slurried with water in a repulping tank. The water slurry is conducted to the evaporating region of an evaporator where at least a portion of the water is converted to steam which directly contacts the slurry and causes evaporation of the light oil and part of the water. The solids are then separated from the water. Since heavy oil initially associated with the aqueous solids is extracted by the light fluidizing oil, the net result is a substantial decrease in the heavy oil content of the recovered solids.

Figure 5:
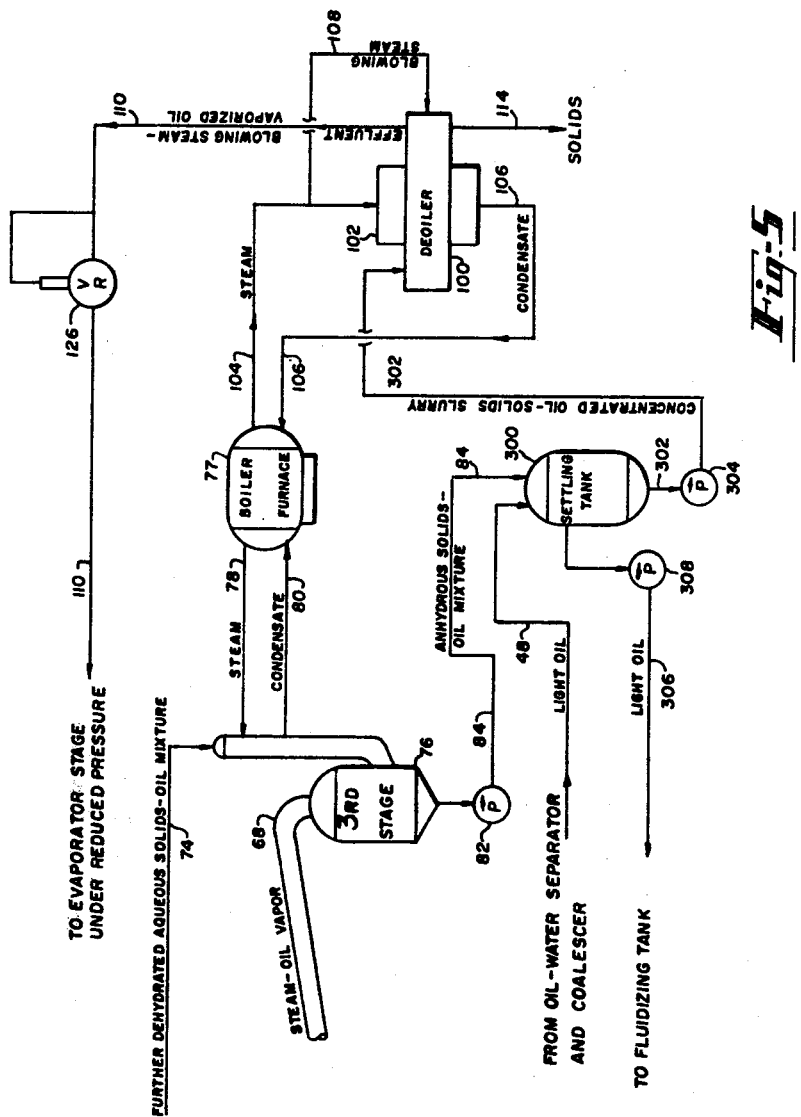
FIG. 5 illustrates a portion of a modified apparatus of FIG. 1 depicting an embodiment wherein the substantially anhydrous slurry of solids in light fluidizing oil is separated by gravity into an oil phase and a concentrated light oil-solids slurry which is conducted to a deoiler apparatus.

In the embodiment exemplified in FIG. 5, the substantially anhydrous slurry of solids in light fluidizing oil is separated by gravity in a settling tank into an oil phase and a concentrated light oil-solids slurry. The separated oil is removed from the top of the settling tank and recycled through the system. The concentrated light oil-solids slurry is pumped to a deoiler apparatus where it is brought into direct contact with blowing steam which causes evaporation of the light oil at a temperature below its normal boiling point. While the deoiler apparatus depicted in FIG. 5 is operating at essentially atmospheric pressure, it will be understood that it may alternatively be operated under reduced pressure.

In the embodiment depicted in FIG. 6, the apparatus is relatively simple and compact in that a single stage evaporator is used and the substantially anhydrous slurry of solids in light fluidizing oil is separated by gravity into a light oil phase and a concentrated light oil-solids slurry, thus making a pressing apparatus unnecessary. The separated light oil is recycled through the system while the concentrated light oil-solids slurry is pumped to a deoiler apparatus. Effluent blowing steam and vaporized light oil from the deoiler apparatus are conducted directly to the single stage evaporator of the system to supply evaporative heat thereto. In view of the single stage evaporator employed, such use of the effluent blowing steam and vaporized light oil from the deoiler apparatus is essential in order to achieve efficient steam utilization in the system.

This invention will be most clearly perceived and best understood through reference to the preferred embodiments as discussed in further detail in connection with the flow diagrams shown in the drawings. In the embodiment illustrated in FIG. 1, a stream of aqueous solids in solution or dispersion enters fluidizing tank 10 through line 12. Light fluidizing oil enters fluidizing tank 10 through line 14. The fluid mixture in fluidizing tank 10 is agitated by means of stirring device 16 and then withdrawn from the fluidizing tank by means of pump 18. Pump 18 delivers the mixture through line 20 to the evaporating region of the first stage or third effect evaporator 22 of an overall drying evaporator assembly or array. In evaporator 22 water and a portion of the light oil are boiled off at a subatmospheric pressure which may typically be about 2 to 10 inches Hg absolute. The temperature of the partially dehydrated and partially deoiled product of the entering mixture of aqueous solids in light oil is in the range of about 70°–250° F. and preferably about 90°–175° F., depending on the pressure in the evaporator. The system is heated by mixed steam and light oil vapor from line 24 which is at a temperature about 30°–40° F. higher than the temperature of the partially dehydrated aqueous solids in oil mixture and which comes from the vapor chamber of the succeeding or second stage of the evaporator. Condensate of the heating vapor is withdrawn through line 26 which meets line 28 at a "T" joint or connection. The condensate is conducted through line 28 to oil-water separator 30. Mixed steam-light oil vapor formed as a result of the partial dehydration of the entering mixture of aqueous solids in light oil is removed from the vapor chamber of evaporator 22 through line 34 into surface condenser 36 within which a partial vacuum is maintained by means of vacuum pump 38 which is connected to surface condenser 36 via vacuum line 40.

The mixture of water and light oil vapors entering surface condenser 36 through line 34 is condensed by cooling water entering the condenser through line 42 and leaving the condenser through line 44. The mixed condensate of warm water and light oil is discharged from the condenser through line 46 into oil-water separator 30.

Inside oil-water separator 30, the mixture of water and light oil is separated into light oil and partially clarified water containing some light oil. The separated light oil is removed from oil-water separator 30 through line 48 and is conducted thereby to light oil storage tank 50.

The partially clarified water is conducted from oil-water separator 30 via line 54 to coalescer 56. Inside coalescer 56, the partially clarified water containing some light oil is separated into light oil and clean product water. The separated light oil is withdrawn from coalescer 56 through line 58, which meets line 48 at a "T" joint, and is ultimately conducted to light oil storage tank 50. Clean product water is withdrawn from coalescer 56 through line 60. If desired, part of the product water may be reused throughout the system. Alternatively, all the recovered water may be stored in a reservoir for later use in applications in which essentially clean water is required.

The partially dehydrated mixture of aqueous solids in light oil from evaporator 22 is continuously removed through line 62 with the assistance of pump 64. The partially dehydrated mixture is forced through line 62 to the evaporating region of second stage 66 of the evaporator. In the second stage evaporator a procedure is followed which is similar to that in the first stage except that the pressure is higher. The pressure in each succeeding evaporator stage is somewhat higher than in the preceding stage, approaching approximately atmospheric pressure in the last stage. The temperature of the further dehydrated product of the second stage evaporator is in the range of about 100°–400° F. and preferably about 125°–350° F., depending on the pressure in the evaporator. The heating medium is mixed steam and light oil vapor which is at a temperature about 30°–40° F. higher than the temperature of the further dehydrated aqueous solids slurry leaving the second stage evaporator. The mixed heating vapor comes through line 68 from the vapor chamber of the third or succeeding evaporator stage. Condensate of the mixed heating vapor is withdrawn from second stage evaporator 66 through line 28 and is discharged into oil-water separator 30. As mentioned above, mixed steam-light oil vapor formed as a result of the furher dehydration of the partially dehydrated mixture of aqueous solids in light oil is removed from the vapor chamber of second stage evaporator 66 through line 24 and is used as the heating medium in first stage evaporator 22.

The further dehydrated slurry of aqueous solids in light oil withdrawn from second stage evaporator 66 is discharged by pump 70 through line 74. The further dehydrated mixture is conducted through line 74 to the evaporating region of third stage 76 of the evaporator. The pressure in the third stage is higher than in the second stage, advantageously being approximately atmospheric. The temperataure of the product of third stage evaporator 76, i.e., a slurry of solids in light oil containing about 1% by weight of water based on the entire slurry, is greater than that of second stage evaporator 66 and is within the range of about 100°–400° F. and preferably about 150°–350° F. The heating medium for third stage evaporator 76 is steam at a temperature about 30°–50° F. higher than that of the product, i.e., an essentially anhydrous slurry of solids in light oil. This steam is generated in boiler-furnace 77 and conveyed to third stage 76 of the evaporator through line 78. Condensate of the heating steam is withdrawn through line 80 and returned to the boiler-furnace. As already mentioned, mixed steam-light oil vapor formed as a result of the still further dehydration of the slurry of solids in light oil is removed from the vapor chamber of third stage evaporator 76 through line 68 and is used as the heating medium in second stage evaporator 66.

The essentially anhydrous slurry of solids in light oil is withdrawn from third stage evaporator 76 and is forced by pump 82 through line 84 to continuous centrifuge 86. The light oil is separated from the solids in centrifuge 86 and is conducted therefrom via line 88 to light oil storage tank 50. Recovered light fluidizing oil is discharged by pump 90 through line 14 to fluidizing tank 10 for recycling through the system. If the process provides a net yield of oil, it may be recovered from tank 50 and stored for use outside the system.

The solids, having residual light oil sorbed thereon, exit from continuous centrifuge 86 and enter live bottom bin 94 via conduit 96. The live bottom of bin 94 causes the solids to advance to the exit thereof where they are conducted by gravity through conduit 98 into cake deoiler apparatus 100. Deoiler apparatus 100 may, if desired, be externally heated by steam generated in boiler-furnace 77 which enters steam jacket 102 through line 104. Condensate of the jacket steam is withdrawn through line 106 and returned to the boiler-furnace. Blowing steam generated in boiler-furnace 77 is conducted via line 104 to line 108, which is connected thereto by a "T" joint, and from line 108 into deoiler apparatus 100 where said steam comes into direct contact with the light oil-laden solids and causes vaporization of said light oil at a temperature below its normal boiling point. Effluent blowing steam and vaporized light oil exit from the deoiler apparatus through line 110.

The solids, free from sorbed light oil, are discharged by gravity from deoiler apparatus 100 through conduit 114 into live bottom bin 116. The screw conveyor bottom of bin 116 conducts the solids to the exit thereof where said solids, free from the fluidizing light oil as well as being in an essentially anhydrous state, are discharged through line 118 into grinder or comminutor 119. By means of grinder 119 the solids are reduced to granular if not powder form, and from the grinder they flow through line 120 to a rotary selector valve 121 by which they may be directed to either line 122 or line 123. Line 122 leads to collecting or bagging equipment, and through it the solids may be withdrawn for use outside the illustrated system. Line 123, shown as active according to the setting of valve 121, leads to the suction of blower 124, and this blower discharges the comminuted solids to the combustion region of boiler-furnace 77 through line 125.

Effluent blowing steam and vaporized light oil exiting from deoiler apparatus 100 are conducted by line 110 to second stage evaporator 66 where the mixed vapor supplies evaporative heat to said second stage evaporator. Since the second evaporator stage is operated at less than atmospheric pressure, a valve 126 which is equipped with a pressure sensor is located on line 110 and serves to maintain slightly less than atmospheric pressure in deoiler apparatus 100. The deoiling step is therefor conducted at essentially atmospheric pressure. Thus, in the embodiment shown, the energies of effluent blowing steam and the vaporized light oil are recovered constructively by supplying heat to second stage evaporator 66. Condensate of the heating steam and vaporized light oil is withdrawn from the second stage evaporator through line 28 and discharged into oil-water separator 30. While the effluent blowing steam and the vaporized light oil from deoiler apparatus 100 are depicted in FIG. 1 as supplying evaporative heat to second stage evaporator 66, it will be understood that the energy of the mixed vapors may be recovered by supplying heat to first stage evaporator 22 or, indeed, to any evaporating stage in the system except to the shellside of third stage evaporator 76 since the oil contained therein would contaminate the condensate returned to boiler-furnace 77 through line 80 and also since the temperature of the vapors may not be sufficiently high to provide for the heat transfer requirements. Alternatively, the effluent blowing steam and vaporized light oil may be used for preheating the aqueous solids-light fluidizing oil mixture by injection into fluidizing tank 10 or, indeed, at any other location in the system where recovery of its energy can offer process credits.

The foregoing description of FIG. 1 applies to the case where the aqueous solids do not initially contain a heavy, relatively non-volatile oil. If there had been a heavy, relatively non-volatile oil originally associated with the aqueous solids, the heavy oil would have been extracted by the light fluidizing oil during the pressing operation. In the embodiment depicted in FIG. 1, the entire oil fraction from the pressing operation is recycled as fluidizing oil. Accordingly, if a heavy oil were present an equilibrium would soon be attained wherein heavy oil was extracted from the aqueous solids by the fluidizing oil at the same rate it was replaced by the recycled oil. The net result would be an essentially dry solids product having substantially the same heavy oil content as that of the original feed on a moisture-free basis.

FIG. 2 depicts a portion of the apparatus used in a modification of the apparatus of FIG. 1 wherein the deoiler apparatus is directly connected to a drying evaporator operating under reduced pressure. Accordingly, the deoiler apparatus is also under reduced pressure. The apparatus of FIG. 2 differs primarily from that of FIG. 1 in that line 110 does not contain a valve 126 equipped with a pressure sensor, and there is a first rotary valve or its equivalent on conduit 98 between live bottom bin 94 and deoiler apparatus 100 and a second rotary valve or its equivalent on conduit 114 between deoiler apparatus 100 and live bottom bin 116. The advantages of operating the deoiler apparatus under reduced pressure are that the deoiling process requires less blowing steam, and it may be carried out at lower temperatures which is advantageous when deoiling a temperature-sensitive material such as a food product or animal feed.

In FIG. 2 light oil-laden solids discharged from continuous centrifuge 86 via conduit 96 enter live bottom bin 94. The live bottom of bin 94 causes the solids to advance to the exit thereof where they enter conduit 98 and are conveyed by rotary valve 127 into deoiler apparatus 100. As in FIG. 1 deoiler apparatus 100 may, if desired, be externally heated by steam which enters steam jacket 102 through line 104. Condensate of the jacket steam is withdrawn through line 106. Blowing steam generated in a boiler-furnace enters deoiler apparatus 100 via line 108 and comes into direct contact with the light oil-laden solids, thus causing vaporization of said light oil. The solids, free from residual light oil, are discharged from deoiler apparatus 100 via conduit 114 and are urged by means of rotary valve 128 into live bottom bin 116. The solids, free from fluidizing light oil as well as being essentially dry, are finally discharged from live bottom bin 116 via conduit 118. However, as described above in connection with FIG. 1, if the aqueous solids initially contained a heavy oil, the essentially dry solids product would contain heavy oil in an amount substantially the same as that of the original feed on a moisture-free basis.

Effluent blowing steam and vaporized light oil exit from deoiler apparatus 100 through line 110. Line 110 is connected to an evaporator stage operating under reduced pressure whereby the energy of the effluent blowing steam and the vaporized light oil is recovered constructively by supplying heat to said evaporator stage. Because, as mentioned above, there is no valve equipped with a pressure sensor on line 110, deoiler apparatus 100 is in direct connection with the evaporator stage operating under reduced pressure. Since rotary valves 127 and 128 are essentially air tight, deoiler apparatus 100 is as a result under reduced pressure even though live bottom bins 94 and 116 to which it is connected are under essentially atmospheric pressure.

FIG. 3 depicts a portion of a modified apparatus of FIG. 1 wherein the aqueous solids originally contain a heavy oil which is extracted therefrom by the light fluidizing oil during the liquid-solid separating step. The light fluidizing oil and the extracted heavy oil are then separated and the light component recycled as fluidizing oil. The net result is a reduction in the heavy oil content of the essentially dry solids product. For example, if the aqueous solids are products of the rendering industry which commonly contain about 10–15 weight percent of heavy oils and fats such as tallow and other animal fats, extraction by the light fluidizing oil yields a product containing only about 6–7 weight percent of such heavy oils and fats. Another example of aqueous solids containing heavy oils and fats is the bark of such trees as fir, spruce, ash and southern pine. Dehydration by the method illustrated in FIG. 3 results in the recovery from the bark of a valuable wax similar to carnauba wax. Yet another example of aqueous solids containing heavy oils is the organic stream from garbage disposal plants. This material typically contains about 5 weight percent of heavy oils in the form of, among other things, polyethylene and polyvinylchloride. Recovery of these polymeric materials makes them available for recycling. Additionally, removal of polyvinylchloride from the dried sludge means that the sludge may be burned without evolution of corrosive hydrogen chloride.

In FIG. 3 a mixture of light fluidizing oil and heavy oil extracted from the solids by the light oil is conducted from centrifuge 86 via line 88 to light-heavy oil storage tank 130. Light oil-laden solids having a reduced heavy oil content compared to the original heavy oil content of the raw feed on a moisture-free basis are discharged from centrifuge 86 through conduit 96 and thereafter treated according to either of the procedures described above in connection with FIG. 1 and FIG. 2.

The mixture of light and heavy oils is withdrawn from tank 130 and forced through line 132 by pump 134 which is located thereon. Steam is introduced into line 132 through line 136 which joins line 132 at a "T" joint. The mixture of light and heavy oils and live steam is conducted through line 132 to stripping evaporator 138. Indirect steam to supply latent heat for the evaporation of the light oil fraction is conducted from a boiler-furnace to stripping evaporator 138 via line 140. Condensate of the indirect steam is returned to the boiler-furnace from stripping evaporator 138 through line 146. The light oil is vaporized in stripping evaporator 138. Light oil vapor mixed with the direct steam introduced through line 136 is conducted from the vapor chamber of evaporator 138 via vapor duct 148 which is joined to line 68 at a "T" joint. As discussed above, line 68 conducts a mixed steam-light oil vapor from third stage evaporator 76 to second stage evaporator 66 to supply evaporative heat thereto. The mixed light oil and water vapors in vapor duct 148 are therefore conducted into line 68 and the combined mixed vapors are used as the source of evaporative heat in second stage evaporator 66.

The extracted heavy oil, which is not vaporized in evaporated 138, is withdrawn from stripping evaporator 138 and forced through line 150 by pump 152 which is located thereon. The heavy oil is conducted via line 150 to heavy oil storage tank 154. The heavy oil can be utilized for fuel or other marketing values depending on the composition of the original aqueous solids feed and whether these materials are useful for animal feed, food for human consumption, or non-food purposes.

As mentioned above in the discussion of FIG. 1, condensate of the mixed heating vapor is withdrawn from second stage evaporator 66 through line 28 and conducted to oil-water separator 30. Inside oil-water separator 30 the mixture is separated into a light oil fraction and partially clarified water containing some light oil. The separated light oil is conducted from oil-water separator 30 via line 48 to light oil recycle tank 156. The partially clarified water is removed from oil-water separator 30 via line 54 and conducted to coalescer 56 where it is separated into light oil and clean water product. The separated light oil is withdrawn from coalescer 56 through line 58, which meets line 48 at a "T" joint, and is ultimately conducted to light oil recycle tank 156.

Light oil is removed from light oil recycle tank 156 by pump 158 and forced through line 160 to fluidizing tank 10. Since the light oil is separated from the extracted heavy oil prior to being recycled to fluidizing tank 10 an equilibrium is not attained, and the net result is the extraction of heavy oil from the solids by light fluidizing oil in centrifuge 86. The extraction of the heavy oil thus reduces the final oil content of the essentially dry solids product, thereby often enhancing the commercial value of the solids for fertilizer, animal feed, food for human consumption and other uses.

It will be understood by those skilled in the art that the modification of FIG. 1 depicted in FIG. 3 is equally applicable to FIG. 2 in cases where the aqueous solids feed is initially associated with a heavy oil. In each case an essentially dry solids product having a reduced heavy oil content is obtained.

FIG. 4 depicts the flow diagram of the apparatus of that embodiment of the invention wherein water-insoluble solids originally contain a heavy oil which is extracted by the light fluidizing oil and thereafter the light fluidizing oil and the extracted heavy oil are separated. The light fluidizing oil-laden water-insoluble solids are slurried with water and said slurry is conducted to an evaporator where at least a portion of the water is converted to steam, thereby directly contacting the aqueous slurry of light oil-laden solids and facilitating the evaporation of said light oil.

In the embodiment of the process employing the apparatus depicted in FIG. 4, a stream of water-insoluble solids associated with a heavy oil and in aqueous dispersion enters fluidizing tank 164 through line 166. Light fluidizing oil enters fluidizing tank 164 through line 168. The liquid mixture in fluidizing tank 164 is agitated by means of stirring device 170 and then withdrawn from the fluidizing tank by means of pump 174. Pump 174 delivers the mixture through line 176 to the evaporating region of second stage evaporator 178 of an overall three-stage evaporator assembly or array. In evaporator 178 water and a portion of the light oil are boiled off at a pressure which may typically be between about 2 to 10 inches Hg absolute and about atmospheric. The temperature of the partially dehydrated and partially deoiled product of the entering mixture of aqueous solids in light fluidizing oil is in the range of about 100°–400° F. and preferably about 125°–350° F., depending on the pressure in the evaporator. The system is heated by mixed steam and light oil vapor from line or vapor duct 180 which is at a temperature about 30°–40° F. higher than the temperature of the partially dehydrated aqueous solids in oil mixture, and which comes from the vapor chamber of the succeeding or third stage of the evaporator. Condensate of the heating vapor is withdrawn through line 182 which meets line 184 at a "T" joint. The mixed condensate is conducted through line 184 to oil-water separator 186. Mixed steam-light oil vapor formed as a result of the partial dehydration of the entering mixture of aqueous solids in light oil is removed from the vapor chamber of evaporator 178 through line 188 to first stage evaporator 190 where the mixed vapors serve as the source of heat for said first stage evaporator. Condensate of the mixed heating vapors is withdrawn from evaporator 190 through line 192, which meets line 184 at a "T" joint, and ultimately through line 184 to oil-water separator 186.

The partially dehydrated mixture of aqueous solids in oil from evaporator 178 is continuously removed through line 194 with the assistance of pump 196. The partially dehydrated mixture is forced through line 194 to the evaporating region of third stage or first effect 198 of the evaporator assembly. In the third stage evaporator a procedure is followed which is similar to that in the second stage except that the pressure is higher. The pressure in each succeeding evaporator stage is usually somewhat higher than in the preceding stage, approaching approximately atmospheric pressure in the third and last stage. The temperature of the product of third stage evaporator 198, i.e., a slurry of solids in light fluidizing oil plus heavy oil originally associated with the solids and containing about 1% by weight of water based on the entire slurry, is greater than that of the product of second stage evaporator 178 and is within the range of about 100°–400° F. and preferably about 150°–350° F. The heating medium is steam at a temperature about 30°–50° F. higher than that of the product, i.e., an essentially completely dehydrated slurry of solids in oil. This steam is generated in boiler-furnace 200 and conveyed to third stage 198 of the evaporator through line 204. Condensate of the heating steam is withdrawn through line 206 and returned to boiler-furnace 200.

The essentially anhydrous slurry of solids in oil is withdrawn from third stage evaporator 198 and is discharged by pump 208 through line 210. The slurry is forced through line 210 to continuous centrifuge 212. The light fluidizing oil and extracted heavy oil are separated from the solids in centrifuge 212 and conducted therefrom through line 214 to light-heavy oil tank 216.

The mixture of light and heavy oils is withdrawn from tank 216 and forced through line 218 by pump 220 which is located thereon. Steam is introduced into line 218 through line 222 which joins line 218 at a "T" joint. The mixture of light and heavy oils and live steam is conducted through line 218 to stripping evaporator 224. Indirect steam to supply latent heat for the evaporation of the light oil fraction is conducted from a boiler-furnace to stripping evaporator 224 via line 226. Condensate of the indirect steam is returned to the boiler-furnace from stripping evaporator 224 through line 228. The light oil is vaporized in stripping evaporator 224. Vaporized light oil and the direct steam introduced through line 222 are conducted from the vapor chamber of evaporator 224 via vapor duct 230 which is joined to vapor duct 180 at a "T" joint. As discussed above, vapor duct 180 conducts a mixed steam-light oil vapor from third stage evaporator 198 to second stage evaporator 178 to supply evaporative heat thereto. The mixed light oil vapor and steam in vapor duct 230 are therefore conducted into line 180 and the combined mixed vapor is used as the source of evaporative heat in second stage evaporator 178.

The extracted heavy oil, which is not vaporized in stripping evaporator 224, is withdrawn therefrom and forced through line 234 by pump 236 which is located thereon. The heavy oil is conducted through line 234 to heavy oil storage tank 238. The heavy oil can be utilized for fuel or other purposes depending on the composition of the original aqueous solids feed.

The water-insoluble solids having residual light oil sorbed thereon are discharged from centrifuge 212 and conducted through conduit 240 to repulping tank 242. Water is conducted through line 244 to repulping tank 242. The mixture of water and solids containing residual light oil in repulping tank 242 is agitated by stirring device 246 and the fluid mixture is then withdrawn from the repulping tank by means of pump 248. Pump 248 delivers the aqueous mixture through line 250 to the evaporating region of first stage evaporator 190 of the overall three-stage evaporator assembly where at least a portion of the water is converted to steam, thereby directly contacting the light oil-laden solids and facilitating the evaporation of light oil therefrom. In evaporator 190 the residual light oil and part of the water are thus boiled off at a pressure which may typically be between about 2 and 10 inches Hg absolute. The entering mixture of water and aqueous solids containing residual light oil is heated in evaporator 190 to a temperature in the range of about 70°–250° F. and preferably about 90°–175° F., depending on the pressure in the evaporator. As mentioned above, the first stage evaporator 190 is heted by a mixed vapor of steam and vaporized light oil from line 188 which is at a temperature about 30°–40° F. higher than the temperature of the deoiled mixture of solids in water. As set forth earlier, condensate of the heating vapor is withdrawn from evaporator 190 through line 192. Water vapor and light oil vapor formed as a result of evaporation of the entering mixture of water and solids containing residual light oil are removed from the vapor chamber of evaporator 190 through line 252 and conducted into surface condenser 254 within which a partial vacuum is maintained by means of vacuum pump 256 which is connected to condenser 254 via vacuum line 258.

Surface condenser 254 is cooled by cooling water which enters the condenser through line 260 and leaves the condenser through line 266. The mixed vapor of steam and vaporized light oil entering condenser 254 through line 252 is condensed therein and the mixed condensate of water and light oil is discharged from the condenser through line 184 and conducted thereby to oil-water separator 186.

The essentially completely deoiled slurry of solids in water from first stage evaporator 190 is continuously removed through line 268 with the assistance of pump 270. Pump 270 forces the slurry of solids in water through line 268 to settling tank 272. The solids settle to the bottom of settling tank 272 from which they are removed as water-wet solids through line 274 with the assistance of pump 276. Supernatant water is removed from the top of settling tank 272 through line 244 and is forced by pump 278 to repulping tank 242 where the water is mixed with solids containing residual light oil and is recycled through the system.

In oil-water separator 186 the mixture of water and light oil is separated into light oil and partially clarified water containing some light oil. The light oil phase is removed from oil-water separator 186 through line 282 and is urged by pump 284 to light oil recycle tank 286 from which it is forced by pump 288 via line 168 to fluidizing tank 164 and thus recycled through the system. If the process provides a net yield of light oil, it may be recovered from tank 286 and stored for use outside the system.

The partially clarified water is conducted from oil-water separator 186 via line 290 to coalescer 292. Inside coalescer 292, the partially clarified water containing some light oil is separated into light oil and clean product water. The separated light oil is withdrawn from coalescer 292 through line 294, which meets line 282 at a "T" joint, and is ultimately conducted to light oil recycle tank 286. Clean product water is withdrawn from coalescer 292 through line 296. The clean product water may be used within the system or it may be removed to storage for use outside the system.

Since the light oil is separated from extracted heavy oil before being recycled to fluidizing tank 164 an equilibrium does not occur, and the ultimate result is the extraction of heavy oil from the water-insoluble solids by light fluidizing oil in centrifuge 212. The extraction of the heavy oil therefore reduces the final heavy oil content of the solids product, a result which often increases the commercial value of the solids for many uses.

FIG. 5 illustrates a portion of a modified apparatus of FIG. 1 wherein the substantially anhydrous slurry of solids in light fluidizing oil is separated by gravity into a light oil phase and a concentrated light oil-solids slurry which is conducted directly to the deoiler apparatus. The gravity separation makes unnecessary a pressing apparatus such as a centrifuge for the separation of the substantially anhydrous slurry of solids in light fluidizing oil into its component parts.

In FIG. 5 a substantially anhydrous mixture of solids in light fluidizing oil is withdrawn from third stage evaporator 76 and urged by pump 82 through line 84 to settling tank 300. The solids settle under the force of gravity to the bottom of settling tank 300 from which they are removed as a concentrated, pumpable light oil-solids slurry via line 302. Pump 304, which is located on line 302, urges the concentrated oil-solids slurry through line 302 to deoiler apparatus 100.

Deoiler apparatus 100 may, if desired, be externally heated by steam jacket 102. Blowing steam generated in boiler-furnace 77 is conducted via line 108 into deoiler apparatus 100 where the steam comes into direct contact with the concentrated light oil-solids slurry and causes vaporization of the light oil at a temperature below its normal boiling point. Effluent blowing steam and vaporized light oil exit from the deoiler apparatus through line 110 and are conducted to an evaporator stage operating under reduced pressure as is described in FIG. 1. Valve 126 which is equipped with a pressure sensor and which is located on line 110 serves to maintain slightly less than atmospheric pressure in deoiler apparatus 100, i.e., essentially atmospheric pressure. The solids, free from light oil, are discharged from deoiler apparatus 100 via conduit 114 and are treated in accordance with the procedure described in FIG. 1.

Light fluidizing oil from the oil-water separator and the coalescer are conducted via line 48 into settling tank 300. The combined light fluidizing oil is discharged from settling tank 300 through line 306 and is urged by pump 308, which is located thereon, to the fluidizing tank for recycling through the system. If the process provides a net yield of oil, it may be recovered from settling tank 300 and stored for use outside the system.

In the foregoing description of FIG. 5, if the aqueous solids had initially contained a heavy, relatively non-volatile oil, it would not have been completely extracted by the light fluidizing oil. The concentrated light oil-solids slurry pumped from settling tank 300 to the deoiler apparatus would contain an appreciable fraction of the non-volatile oil which would not be removed in the deoiler. The essentially dry solids product would thus contain at least some heavy, non-volatile oil.

It will be understood by those skilled in the art that the modification of FIG. 1 depicted in FIG. 5 wherein the deoiler apparatus is operated at essentially atmospheric pressure is equally applicable to the case where the deoiler apparatus is operated at reduced pressure as is illustrated in FIG. 2. In either case an essentially dry solids product is obtained.

FIG. 6 depicts the apparatus of an embodiment of the invention wherein a compact, relatively simple system is employed. The apparatus is characterized by employment of a single stage evaporator and a settling tank for the gravity separation of the substantially anhydrous slurry of solids in light fluidizing oil into an oil phase and a concentrated oil-solids slurry. The concentrated slurry is pumped to the deoiler apparatus where it is directly contacted with blowing steam. Effluent blowing steam and vaporized light oil from the deoiler apparatus are conducted to the single stage evaporator to supply evaporative heat thereto, a necessary expedient to achieve efficient steam utilization in the compact system.

In FIG. 6 a stream of aqueous solids enters fluidizing tank 310 through line 312. Light fluidizing oil enters fluidizing tank 310 through line 314. The fluid mixture in fluidizing tank 310 is agitated by means of stirring device 316 and is then withdrawn from the tank by means of pump 318. Pump 318 forces the mixture through line 320 to the evaporating region of single stage evaporator 326. In evaporator 326 substantially all the water and a portion of the light oil are boiled off at a pressure that is subatmospheric. The temperature of the product of single stage evaporator 326, i.e., a slurry of solids in light oil containing about 1% by weight of water based on the entire slurry, is within the range of about 100°–400° F. and preferably about 150°–350° F., depending on the pressure in the evaporator. The heating medium for evaporator 326 is a mixture of steam and light oil vapor at a temperature about 30°–50° F. higher than that of the product, i.e., an essentially anhydrous slurry of solids in light oil. Steam for the evaporator is generated in boiler-furnace 328 and conducted to evaporator 326 through line 330. Also, a mixture of steam and light oil vapor is conducted to evaporator 326 from deoiler apparatus 332 via line 334.

Condensate of the heating vapor is withdrawn through line 336 and conducted to oil-water separator 338. Mixed steam-light oil vapor formed as a result of the essentially complete dehydration of the entering mixture of aqueous solids in light oil is removed from the vapor chamber of evaporator 326 through line 340 and conducted to surface condenser 342 within which a partial vacuum is maintained by means of vacuum pump 344 which is connected to surface condenser 342 via vacuum line 346.

The mixture of steam and light oil vapor entering surface condenser 342 is condensed by cooling water entering the condenser through line 348 and leaving the condenser through line 350. The mixed condensate of warm water and light oil is discharged from the condenser through line 352 into oil-water separator 338.

Inside oil-water separator 338, the mixture of water and light oil is separated into light oil and partially clarified water containing some light oil. The separated light oil is removed from oil-water separator 338 through line 354 and is conducted thereby to settling tank 356.

The partially clarified water is conducted from oil-water separator 338 via line 358 to coalescer 360. Inside coalescer 360, the partially clarified water containing some light oil is separated into light oil and clean product water. The separated light oil is withdrawn from coalescer 360 through line 362, which meets line 354 at a "T" joint, and is ultimately conducted to settling tank 356. Clean product water is withdrawn from coalescer 360 through line 364. If desired, a portion of the clean product water may be withdrawn from coalescer 360 via line 366 and conducted to boiler furnace 328 for reuse throughout the system. Alternatively, all the recovered clean water may be withdrawn through line 364 and conducted to a reservoir for later use in applications in which essentially clean water is required.

The essentially anhydrous mixture of solids in light fluidizing oil is withdrawn from single stage evaporator 326 and urged by pump 368 through line 370 to settling tank 356. The solids settle under the force of gravity to the bottom of settling tank 356 from which they are removed as a concentrated, pumpable light oil-solids slurry via line 372. Pump 374, which is located on line 372, urges the concentrated oil-solids slurry through line 372 to deoiler apparatus 332.

Deoiler apparatus 332 may, if desired, be externally heated by steam generated in boiler-furnace 328 which enters steam jacket 376 via line 378. Condensate of the jacket steam is withdrawn through line 380, which meets line 366 at a "T" joint, and is ultimately returned to the boiler-furnace. Blowing steam generated in boiler-furnace 328 is conducted via line 378 to line 382, which is connected thereto by a "T" joint, and from line 382 into deoiler apparatus 332 where said blowing steam comes into direct contact with the concentrated light oil-solids slurry and causes vaporization of the light oil at a temperature below its normal boiling point. Effluent blowing steam and vaporized light oil exit from the deoiler apparatus through line 334 and are conducted thereby to single stage evaporator 326 where the mixed vapor supplies evaporative heat to said evaporator. Since evaporator 326 is operated at less than atmospheric pressure, a valve 383 which is equipped with a pressure sensor is located on line 334 and serves to maintain slightly less than atmospheric pressure in deoiler apparatus 332. The deoiling step in the illustrated embodiment is therefore conducted at essentially atmospheric pressure. Alternatively, the effluent blowing steam and vaporized light oil may be used for preheating the aqueous solids-light fluidizing oil mixture by injection into fluidizing tank 310 or, indeed, at any other location in the system where recovery of its energy can offer process credits. The use of this mixed vapor to supply evaporative heat to the single stage evaporator or elsewhere in the system is necessary to achieve efficient steam utilization in the compact apparatus depicted in the embodiment of FIG. 6.

The solids, free from light fluidizing oil, are discharged by gravity from deoiler apparatus 332 through conduit 384 into live bottom bin 386. The screw conveyor bottom of bin 386 conducts the solids to the exit thereof where said solids, free from the light fluidizing oil as well as being in an essentially anhydrous state, are discharged through line 388 into grinder or comminuter 390. By means of grinder 390 the solids are reduced to granular if not powder form, and from the grinder they flow through line 392 to a rotary selector valve 394 by which they may be directed to either line 396 or line 398. Line 396 leads to collecting or bagging equipment, and through it the solids may be withdrawn for use outside the illustrated system. Line 398, shown as active according to the setting of valve 394, leads to the suction of blower 400, and the blower discharges the comminuted solids through line 402 to the combustion region of boiler-furnace 328.

As indicated above, the essentially anhydrous mixture of solids in light fluidizing oil in settling tank 356 separates under the force of gravity into a lower solids phase and a supernatant light oil phase. The solids are removed from the settling tank as a concentrated light oil-solids slurry and conducted to deoiler apparatus 332. The supernatant light fluidizing oil is discharged from settling tank 356 through line 314 and is urged by pump 404, which is located thereon, to fluidizing tank 310 for recycling through the system. If the process provides a net yield of oil, it may be recovered from settling tank 356 and stored for use outside the system.

As described above in connection with the description of FIG. 5, if the aqueous solids had initially contained a heavy, relatively non-volatile oil, it would not have been completely extracted by the light fluidizing oil. As a result, the essentially dry solids product of the embodiment of this invention illustrated in FIG. 6 would contain at least some heavy, non-volatile oil.

Since the flow diagrams as shown in the drawings have been discussed above in connection with the dehydration and subsequent deoiling of aqueous solids generally, it will be understood by those skilled in the art that our invention may be used to advantage in the dehydration in a light oil medium, followed by gross deoiling, of aqueous waste solids and aqueous solids having intrinsic value. Examples of such aqueous solids are sewage sludge, slaughter house effluent and rendering materials, inorganic salts, pharmaceutical products, certain tree barks, the organic streams from garbage disposal plants, various aqueous chemicals and mixtures thereof, animal feeds, and food products for human consumption.

Thus, the instant invention provides process and apparatus for the recovery of clean water and solids from aqueous solids dehydrated in a light fluidizing oil medium that is immiscible with water. The process is characterized by the recovery of residual light fluidizing oil from said solids after the dehydration thereof. Following the dehydration step, the concentrated light oil-solids slurry or the light oil-laden solids are brought into direct contact with blowing steam. The blowing steam, if superheated, supplies latent heat for the evaporation of the residual light fluidizing oil and furthermore, since the light oil is water-immiscible, its direct contact with the blowing steam amounts essentially to a steam distillation wherein the light oil in the presence of blowing steam boils at a temperature below its normal boiling point. The light fluidizing oil may be evaporated from the solids at even lower temperatures by being contacted with blowing steam at subatmospheric pressures. As a result of such reduced pressures, not only is the light oil more readily evaporated from the solids with less heat energy being required, but it makes possible the use of higher boiling light fluidizing oils. Furthermore, this invention makes possible the winning of solids that are not only dehydrated but which are de-oiled beyond the point usually attainable by mechanical means. Moreover, if the aqueous solids feed is initially associated with a heavy, relatively non-volatile oil, embodiments of the instant invention make possible its substantial removal from the solids product where it may, if it has value, be used outside the system. On the other hand, if the heavy oil initially associated with the aqueous solids is not separated from the light fluidizing oil prior to its being recycled through the system, an equilibrium is set up whereby the heavy oil content of the dehydrated product remains essentially the same as that of the feed material on a water-free basis.

While specific embodiments of the present invention have been shown and described in detail to illustrate the utilization of the inventive principles, it is to be understood that such showing and description have been offered only by way of example and not by way of limitation. Protection by Letters Patent of this invention in all its aspects as the same are set forth in the appended claims is sought to the broadest extent that the prior art allows.

We claim as our invention:

1. A process for the recovery of clean water and substantially fluidizing oil-free solids from water-insoluble aqueous solids originally associated with a heavy, relatively non-volatile oil and dehydrated in an oil medium comprising the steps of (1) admixing an aqueous slurry of said solids with a low viscosity, relatively volatile, water-immiscible light fluidizing oil to obtain a mixture which will remain fluid and pumpable after the removal of the water content therefrom; (2) subjecting the resultant oil-containing mixture to dehydration by heat evaporation whereby substantially all the water and part of the light fluidizing oil are vaporized, yielding a mixed water and light oil vapor and a substantially anhydrous solids in oil slurry; (3) condensing said mixed water and light oil vapor; (4) separating the resultant condensate into a clean water fraction and a light oil fraction; (5) expressing at least some of the relatively volatile, water-immiscible light fluidizing oil and extracted heavy oil from said substantially anhydrous solids in oil slurry; (6) slurrying the resultant solids carrying residual light fluidizing oil with water; (7) heating the resultant slurry to convert a portion of said water to blowing steam which directly contacts said solids carrying residual light fluidizing oil, thereby facilitating the removal of substantially all the light oil therefrom; (8) allowing the solids in the resultant water-solids slurry to settle under the force of gravity; (9) removing the supernatant water from the settled solids, said solids having a reduced heavy oil content; (10) dividing the expressed light oil and extracted heavy oil of step (5) into a light oil fraction and a heavy oil fraction, and (11) combining the light oil fraction of step (10) with the separated light oil fraction of step (4) and admixing those combined fractions with fresh aqueous solids and thereby recycling them through the process as fluidizing oil.

2. The process of claim 1 wherein heat evaporation step (2) is carried out at temperatures within the range of about 100° F. to 400° F., and heating step (7) is carried out at temperatures within the range of about 70° F. to 250° F.

3. An apparatus for recovering clean water and substantially oil-free solids from water-insoluble aqueous solids dehydrated in a light fluidizing oil medium with said aqueous solids being originally associated with a heavy, relatively non-volatile oil, said apparatus comprising (1) a tank adapted to receive a stream of said aqueous solids and provided with a stirring or mixing mechanism, (2) a light fluidizing oil reservoir, (3) means for transmitting light fluidizing oil from said light oil reservoir to said tank wherein said light fluidizing oil and aqueous solids may be mixed, (4) a multi-stage dehydrating evaporator comprising at least first and second stages, (5) a conduit extending from said tank to the second stage of said multi-stage dehydrating evaporator wherethrough may flow a stream of aqueous solids admixed with light fluidizing oil from said tank into the evaporating region of the second stage of said multi-stage dehydrating evaporator to serve as feed material therefor, (6) a conduit extending from the vapor chamber of the second stage of the dehydrating evaporator to the evaporating region of the first stage thereof through which may flow a mixture of water vapor and light oil vapor formed as a result of heat evaporation of said aqueous solids and light fluidizing oil mixture to thereby act as a source of evaporative heat in said first stage, (7) a liquid-solid separating means, (8) a conduit extending from the second stage of said dehydrating evaporator to said liquid-solid separating means wherethrough may flow a stream of a substantially anhydrous slurry of water-insoluble solids in light fluidizing oil, (9) an oil tank, (10) a conduit extending from said liquid-solid separating means to said oil tank wherethrough may flow a mixture of light fluidizing oil and heavy oil extracted from said solids, (11) a stripping evaporator wherein the light fluidizing oil and any incidentally associated water or water vapor may be separated from said oil mixture by heat evaporation, (12) a conduit extending from said oil tank to said stripping evaporator wherethrough may flow said oil mixture to serve as feed material to the evaporating region of that evaporator, (13) condensing means, (14) a conduit extending from the vapor chamber of said stripping evaporator to said condensing means wherethrough may flow a mixture of water vapor and light oil vapor formed by heat evaporation in said stripping evaporator, (14) an oil-water separating means, (15) a conduit extending from said condensing means to said oil-water separating means wherethrough may flow a mixed condensate of water and light oil from said condensing means to said oil-water separating means wherein said mixed condensate may be separated into a clean water product and light oil, (16) a repulping tank provided with a mixing or stirring device, (17) a conduit extending from said liquid-solid separating means to said repulping tank through which may flow solids carrying residual light fluidizing oil, (18) a settling tank disposed to serve as a water reservoir, (19) a conduit extending from said settling tank to said repulping tank wherethrough may flow water to be admixed with said solids carrying residual light fluidizing oil in said repulping tank, (20) a conduit extending from said repulping tank to the first stage of said multi-stage dehydrating evaporator wherethrough may flow an aqueous slurry of said water-insoluble solids carrying residual fluidizing oil from said repulping tank into the evaporating region of said first stage of the dehydrating evaporator to serve as feed material therefor, (21) a condenser distinct from said condensing means (13), (22) a conduit extending from the vapor chamber of said first stage of the dehydrating evaporator through which may flow water vapor and light oil vapor formed as a result of heating said aqueous slurry of solids carrying residual light fluidizing oil, (23) a conduit extending from said condenser to said oil-water separating means wherethrough may flow a mixed condensate of water and light oil from said condenser to said oil-water separating means for mixing with the oil-water condensate returned to said oil-water separating means from condensing means (13) and, along with that first-designated condensate, separation into a clean water product and light oil, (24) a conduit extending from said first stage of the dehydrating evaporator to said settling tank wherethrough may flow an aqueous slurry of solids and any residually associated light fluidizing oil from said first stage of the dehydrating evaporator to said settling tank wherein that slurry may be separated into wet solids and supernatant water, (25) means for separately withdrawing light oil and clean water from said oil-water separating means, and (26) a conduit extending from said withdrawing means to said light fluidizing oil reservoir (2) wherethrough may flow a stream of light oil as feed material to that reservoir for recycling therefrom to said tank (1).

4. The apparatus of claim 3 which further comprises a combustion apparatus associated with said multi-stage dehydrating evaporator and said stripping evaporator for supplying evaporative heat thereto.

5. The apparatus of claim 3 wherein said liquid-solid separating means is a continuous centrifuge.

UNITED STATES PATENT AND TRADEMARK OFFICE
CERTIFICATE OF CORRECTION

PATENT NO. : 4,289,578
DATED : September 15, 1981
INVENTOR(S) : Charles Greenfield et al.

It is certified that error appears in the above—identified patent and that said Letters Patent is hereby corrected as shown below:

Column 3, line 40, for "waterimmiscible" read --water-immiscible-.

Column 6, line 32, for "separate" read --separated--.

Column 7, line 40, for "waterimmiscible" read --water-immiscible--.

Column 8, line 31, for "waterimmiscible" read --water-immiscible--;

line 44, for "ligh" read --light--.

Column 13, line 25, for "furher" read --further--.

Column 19, line 33, for "heted" read --heated--.

Signed and Sealed this

Ninth Day of November 1982

[SEAL]

Attest:

GERALD J. MOSSINGHOFF

*Attesting Officer*   *Commissioner of Patents and Trademarks*